(12) United States Patent
Tang et al.

(10) Patent No.: US 9,891,385 B2
(45) Date of Patent: Feb. 13, 2018

(54) INTEGRATED LENS WITH MULTIPLE OPTICAL STRUCTURES AND VENT HOLE

(71) Applicants: Xiaohui Tang, Chengdu (CN); Qiang Wang, Chengdu (CN); Kui Wu, Chengdu (CN); Yuanzhong Xu, West Hills, CA (US)

(72) Inventors: Xiaohui Tang, Chengdu (CN); Qiang Wang, Chengdu (CN); Kui Wu, Chengdu (CN); Yuanzhong Xu, West Hills, CA (US)

(73) Assignee: Source Photonics (Chengdu) Co., Ltd., Chengdu (CN)

(*) Notice: Subject to any disclaimer, the term of this patent is extended or adjusted under 35 U.S.C. 154(b) by 112 days.

(21) Appl. No.: 14/800,062

(22) Filed: Jul. 15, 2015

(65) Prior Publication Data

US 2016/0238794 A1 Aug. 18, 2016

Related U.S. Application Data

(63) Continuation-in-part of application No. 14/426,326, filed as application No. PCT/CN2015/072957 on Feb. 12, 2015.

(51) Int. Cl.
| | |
|---|---|
| *G02B 6/32* | (2006.01) |
| *H04B 10/50* | (2013.01) |
| *H04B 10/40* | (2013.01) |
| *H04B 10/67* | (2013.01) |
| *G02B 6/42* | (2006.01) |

(Continued)

(52) U.S. Cl.
CPC ............... *G02B 6/32* (2013.01); *G02B 1/041* (2013.01); *G02B 6/3825* (2013.01); *G02B 6/3865* (2013.01); *G02B 6/4214* (2013.01); *G02B 6/4292* (2013.01); *H04B 10/40* (2013.01); *H04B 10/501* (2013.01); *H04B 10/67* (2013.01)

(58) Field of Classification Search
CPC .......... G02B 6/32; G02B 6/4286; G02B 6/42; G02B 6/4206; G02B 6/4214; G02B 6/4255; G02B 6/4292; G02B 6/4295; G02B 6/4246

See application file for complete search history.

(56) References Cited

U.S. PATENT DOCUMENTS

| | | | | |
|---|---|---|---|---|
| 4,699,453 A | * | 10/1987 | Roberts | ............... G02B 6/2817 385/33 |
| 6,198,864 B1 | * | 3/2001 | Lemoff | .............. G02B 6/29367 385/24 |

(Continued)

*Primary Examiner* — Andrew Jordan
(74) *Attorney, Agent, or Firm* — Andrew D. Fortney; Central California IP Group, P.C.

(57) ABSTRACT

An integrated lens with integrated functional optical surfaces for use in optical communication is disclosed. The integrated lens includes first and second cavities and a fiber adapter. The device also includes integrated first and second lenses. The first cavity houses one or more optical transmitting and/or receiving devices. The second cavity has a first optical surface and an optional second optical surface. The fiber adapter has the second lens. The integrated lens enables a small size, a light weight, high coupling and a high transmission efficiency, and can be produced by injection molding using a single mold. The integrated lens is applicable to optical signal coupling, fiber connections, optical modules, and optical or optoelectronic communication.

20 Claims, 6 Drawing Sheets

(51) Int. Cl.
*G02B 6/38* (2006.01)
*G02B 1/04* (2006.01)

(56) References Cited

U.S. PATENT DOCUMENTS

| | | | | |
|---|---|---|---|---|
| 6,668,113 B2 * | 12/2003 | Togami | .................... | G02B 6/43 385/31 |
| 6,888,988 B2 * | 5/2005 | Vancoille | ............. | G02B 6/4246 385/3 |
| 6,941,047 B2 * | 9/2005 | Capewell | ........... | G02B 6/29367 385/33 |
| 6,959,133 B2 * | 10/2005 | Vancoill | ............... | G02B 6/4204 385/140 |
| 7,264,408 B2 * | 9/2007 | Togami | ................ | G02B 6/4292 385/53 |
| 7,399,125 B1 * | 7/2008 | Whaley | ................ | G02B 6/4204 385/88 |
| 7,539,367 B2 * | 5/2009 | Tamura | ................ | G02B 6/4214 385/14 |
| 7,556,440 B2 * | 7/2009 | Birincioglu | .......... | G02B 6/4206 385/33 |
| 7,654,750 B2 * | 2/2010 | Brenner | ............... | G02B 6/4246 385/89 |
| 7,850,374 B2 * | 12/2010 | Vancoille | ............. | G02B 6/4201 385/14 |
| 8,197,147 B2 * | 6/2012 | Lee | ...................... | G02B 6/4204 372/50.23 |
| 8,283,678 B2 * | 10/2012 | Morioka | ............... | G02B 6/4214 257/82 |
| 8,303,195 B2 * | 11/2012 | Adachi | ................ | G02B 6/4204 385/73 |
| 8,335,411 B2 * | 12/2012 | Kuznia | ................ | G02B 6/4214 385/14 |
| 8,457,457 B2 * | 6/2013 | Morioka | ............... | G02B 6/4206 385/33 |
| 8,478,094 B2 * | 7/2013 | Hsu | ...................... | G02B 6/4214 385/47 |
| 8,483,571 B2 * | 7/2013 | McColloch | .......... | G02B 6/4206 359/629 |
| 8,641,293 B2 * | 2/2014 | Lin | ...................... | G02B 6/3893 385/53 |
| 8,696,219 B2 * | 4/2014 | McColloch | ............ | G02B 6/425 385/14 |
| 8,787,714 B2 * | 7/2014 | Morioka | ............... | G02B 6/4214 385/15 |
| 8,923,670 B2 * | 12/2014 | Zbinden | ............... | G02B 6/4214 385/33 |
| 9,063,281 B2 * | 6/2015 | Lin | ...................... | G02B 6/4286 |
| 9,069,142 B2 * | 6/2015 | Fortusini | ................ | G02B 6/322 |
| 9,134,489 B2 * | 9/2015 | Zbinden | ............... | G02B 6/4214 |
| 9,195,017 B2 * | 11/2015 | Liao | ..................... | G02B 6/4286 |
| 9,223,098 B2 * | 12/2015 | Morioka | ............... | G02B 6/4214 |
| 9,250,401 B2 * | 2/2016 | Lim | ..................... | G02B 6/4215 |
| 9,294,197 B2 * | 3/2016 | Giziewicz | ............ | G02B 6/4214 |
| 9,360,642 B2 * | 6/2016 | Morioka | ............... | G02B 6/4286 |
| 9,417,409 B2 * | 8/2016 | Howard | ............... | G02B 6/3829 |
| 2004/0017977 A1 * | 1/2004 | Lam | ..................... | G02B 6/4204 385/49 |
| 2004/0165828 A1 * | 8/2004 | Capewell | ........... | G02B 6/29367 385/47 |
| 2004/0179784 A1 * | 9/2004 | Vancoille | ............ | G02B 6/4246 385/47 |
| 2005/0018981 A1 * | 1/2005 | Modavis | ............... | G02B 6/4292 385/93 |
| 2006/0159404 A1 * | 7/2006 | Vancoille | ............ | G02B 6/4201 385/88 |
| 2007/0036493 A1 * | 2/2007 | Brenner | ............... | G02B 6/4246 385/89 |
| 2008/0226228 A1 * | 9/2008 | Tamura | ................ | G02B 6/4214 385/33 |
| 2009/0324175 A1 * | 12/2009 | Everett | .................... | G02B 6/32 385/72 |
| 2010/0014806 A1 * | 1/2010 | Lee | ...................... | G02B 6/4204 385/15 |
| 2011/0123151 A1 * | 5/2011 | Zbinden | ............... | G02B 6/4214 385/33 |
| 2012/0063721 A1 * | 3/2012 | Chen | .................. | H04B 10/564 385/33 |
| 2014/0072311 A1 * | 3/2014 | Giziewicz | ............ | G02B 6/4214 398/135 |
| 2014/0226988 A1 * | 8/2014 | Shao | ..................... | H04B 10/40 398/139 |
| 2016/0238794 A1 * | 8/2016 | Tang | ..................... | G02B 6/32 |
| 2016/0341903 A1 * | 11/2016 | Tang | ..................... | G02B 6/32 |

\* cited by examiner

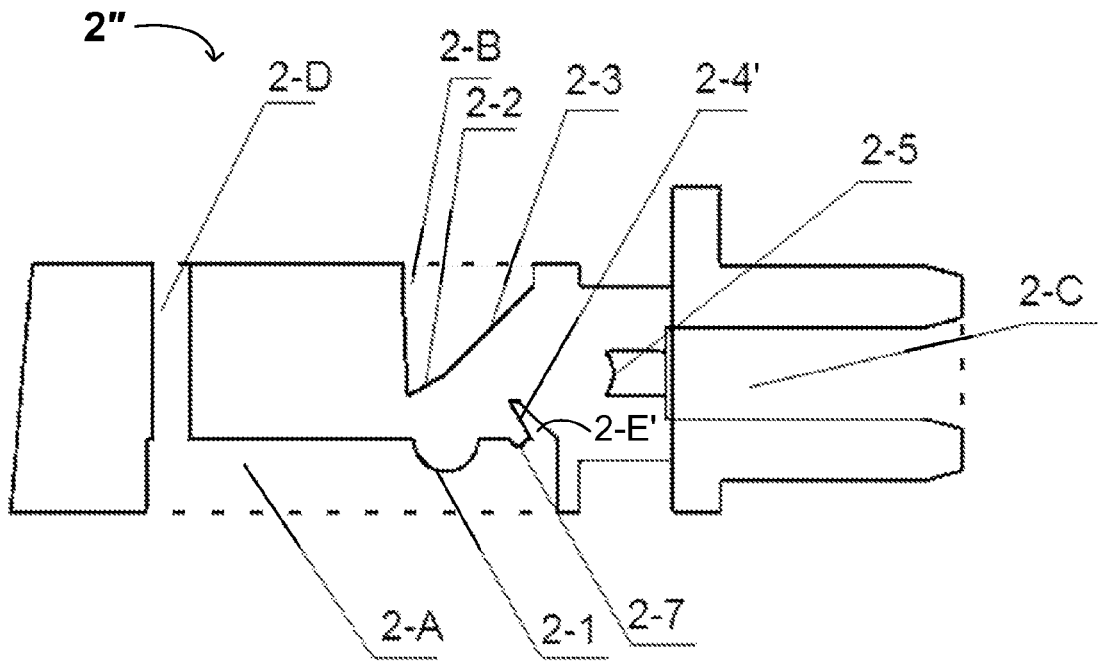
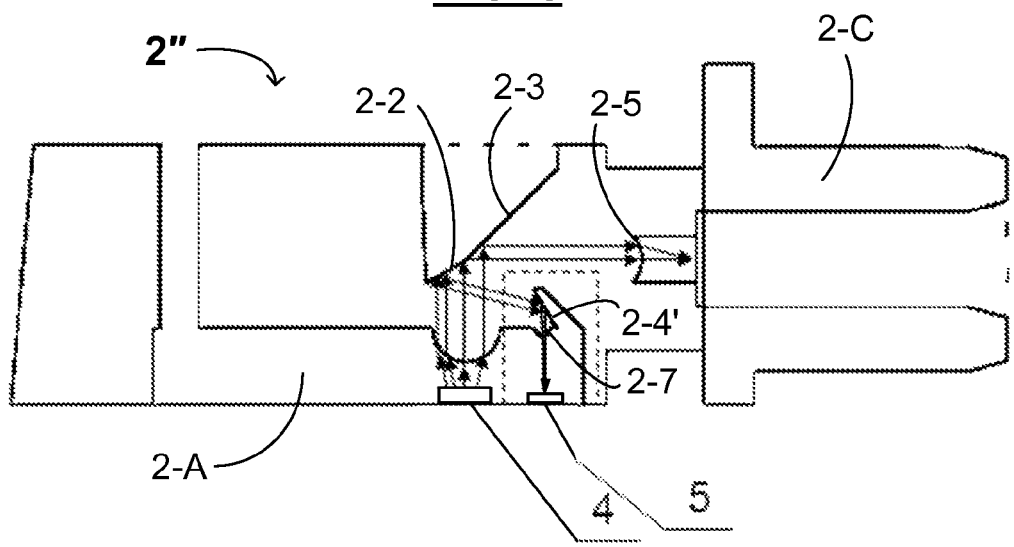

INTEGRATED LENS WITH MULTIPLE OPTICAL STRUCTURES AND VENT HOLE

RELATED APPLICATIONS

This application is a continuation-in-part of U.S. patent application Ser. No. 14/426,326, filed Mar. 5, 2015, pending, which is a national phase application of International Pat. Appl. No. PCT/CN2015/072957, filed Feb. 12, 2015, both of which are incorporated herein by reference in their entireties.

FIELD OF THE INVENTION

The present invention relates to the field of optical communication, especially to optical modules for multi-mode optical or optoelectronic communication.

DISCUSSION OF THE BACKGROUND

At present, optical communication is highly miniaturized and fast. As optical modules play an important role in facilitating the development and modernization of the optical communications industry, smaller and faster optical modes are continuously needed. Miniaturization brings more and more functional blocks and/or structures integrated into a limited device space, and accordingly, the connections and/or interface(s) between the optical module and the communication system become more complicated.

Optical signal transmission and conversion in optical modules are the building blocks of optical communication. For this purpose, a great number of optical transmitters, receivers and photoelectric detectors are employed in optical modules. As printed circuit boards are put in use, optical transmitters, receivers and photoelectric detectors are attached to positions on the PCB in an optical module. The circuitry on the PCB is configured to link the devices together properly. In this way, the production cost of optical modules goes down greatly, while the structure of the device generally becomes more compact.

One typically utilizes optical coupling and/or connecting devices to transmit the optical signals from optical transmitters on a PCB in an optical module, or guide incoming optical signals from an external optical device (e.g., a client) to photoelectric detectors on a PCB in an optical module. However, the cost and complexity of conventional optical coupling and/or connecting devices is high. Many conventional optical coupling and/or connecting devices employ a plurality of individual optical lenses to focus, change or conduct light paths of optical signals, and the installation and production of such individual lenses may be unacceptably complicated, costly and/or inefficient.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide an integrated lens (e.g., an optical coupling and/or connecting device) with one or more lenses and other optical surfaces, such as mirrors. Light path coupling and linking can be achieved in the transmitter or receiver in an optical module using one or more lenses.

In order to achieve the present objective(s), in one respect, the present invention concerns an integrated lens with multiple optical structures and/or surfaces, comprising a first cavity (e.g., a housing or space for one or more optoelectronic devices), a second a cavity (e.g., a second cavity), and a fiber adapter. The first cavity is on a first side of the integrated lens, and the second cavity is on a second side of the integrated lens. The fiber adapter and a first optical surface (e.g., a mirror or other reflective surface) of the integrated lens face each other along an optical axis of a light path between the fiber adapter and the first optical surface, and the center axis of the fiber adapter is parallel with the bottom of the integrated lens. The optical coupler has a first, integrated lens extending into the first cavity. The first lens is generally convex, and is positioned above an optoelectronic transmitting or receiving device, such as a laser diode or a photodiode. The second cavity generally forms the first optical surface and may form an optional second optical surface, such as a mirror (e.g., in transmitter embodiments). The first and second optical surfaces are planar, and in some embodiments, intersect with each other at an angle of 160-175°. The fiber adapter includes a second lens that extends into the integrated lens. The second lens may be concave or convex.

Furthermore, in embodiments relating to an integrated lens adapted for an optoelectronic transmitter, the first cavity may further contain a subcavity forming or defining a third optical surface (e.g., a mirror or other reflective surface) that is generally planar and sloped at a predetermined angle relative to one or more planar surfaces of the first cavity. The subcavity is generally adjacent or proximate to the fiber adapter (e.g., between the first lens and the fiber adapter).

The angle between the third optical surface and the planar surface of the first cavity that is parallel to planar uppermost and lowermost surfaces of the integrated lens is a first predetermined angle. Using this planar surface as a reference plane, the first predetermined angle is, in some embodiments, $101°\pm x°$, where x is a positive number $\leq 15$ (e.g., $101°\pm 7°$, $101°\pm 3°$, etc.). Conversely, the angle is $79°\pm x°$. In such embodiments, the light-receiving surface of the third optical surface faces the light-reflecting surface of the second optical surface. In other embodiments, the third optical surface is at second predetermined angle with regard to the planar surface of the first cavity that is parallel with planar uppermost and lowermost surfaces of the integrated lens. Using this planar surface as a reference plane, the second predetermined angle is, in some embodiments, $60°\pm y°$, where y is independently a positive number $\leq 15$ (e.g., $60°\pm 5°$, $60°\pm 3°$, etc.). The subcavity enables a relatively simple, low-cost injection molding process for making the integrated lens.

In such cases, when the optical signal reflected by the second optical surface is incident upon the third optical surface, the sum of the incident angles are greater than the total reflection critical angle. That is, the optical signal can be reflected to an optical monitoring detector (e.g., a photodiode [PD] or avalanche photodiode [APD]) with minimal losses using the third optical surface. In embodiments relating to an optical transmitter, the monitoring detector is in the first cavity, below the third optical surface. This structure is relatively simple, and provides higher reflection efficiency.

In further embodiments relating to an integrated lens adapted for an optoelectronic transmitter, the first cavity may further contain a third lens. The third lens is convex, and located between the first lens and the third optical surface (e.g., above the optical monitoring detector), adjacent or proximate to the third optical surface at its intersection with the planar surface of the first cavity that is parallel to planar uppermost and lowermost surfaces of the integrated lens. Light (e.g., at least part of an optical signal) reflected by the third optical surface is focused by the third lens on the optical monitoring detector below the third optical surface. The optical signal reflected by the third optical surface can be more effectively focused by the third lens on the optical monitoring detector than in the absence of the third lens, thereby increasing the detection efficiency.

The integrated lens further contains a vent hole configured to permit air or other gas(es) to pass freely into and out of the first cavity. In some embodiments, the vent hole is at a portion or end of the integrated lens opposite from the fiber adapter, but its position is not so limited. The vent hole extends through the integrated lens, with one end exposed to the exterior of the integrated lens and an opposite end connected to the first cavity.

The bottommost surface of the integrated lens may be attached to a substrate such as a printed circuit board (PCB) with an adhesive such as optical cement. As the first cavity contains air, the air in the first cavity can escape from below the integrated lens through the vent hole, which is in gaseous communication with the uppermost surface of the integrated lens. Meanwhile, the heat produced by devices on the PCB (such as a laser diode, photodiode, etc.) during operation of the optical module can be dissipated through the vent hole to reduce the operating temperature of the devices on the PCB and keep the module operating stably.

The integrated lens may be produced by injection molding, in a single molding process (i.e., without attachment of further components). The first cavity, the second cavity, the first and second lenses, the first optical surface, the second optical surface, the third optical surface, the fourth optical surface, the second lens, the third lens and the vent hole structure therein can be formed in a single structure by injection molding in a single molding process. Thus, a method of making the integrated lens may comprise injecting a material for the integrated lens into a mold having a shape of the integrated lens, and removing the injected material from the mold. The method may further comprise heating the material for the integrated lens before injecting it into the mold, and cooling the injected material, before and/or after removing the injected material from the mold. This method is beneficial to product manufacturing due to the simple operation, low cost, and high production efficiency thereof. The integrated lens(es) may comprise or be made from a highly transparent, chemically and mechanically stable material that can be injection molded, such as glass, a polyetherimide (PEI), a polyethersulfone (PES), polyethylene terephthalate (PET), a polystyrene (PS), or polymethyl methacrylate (PMMA).

Preferably, the integrated lens is made from PEI. The glass transition temperature of PEI is 216° C. PEI has a high dielectric strength, natural flame resistance, and extremely low smoke generation. PEI has excellent mechanical properties (such as high stiffness or modulus of elasticity) and performance in continuous use, up to a temperature of 340° F. (170° C.). A standard, unfilled PEI (e.g., commercially available under the trade name ULTEM 1000 from Saudi Basic Industries Corporation [Sabic], Pittsfield, Mass.) has a typical thermal conductivity of 0.22 W/(m·K). PEI is a good source material for an optical lens.

Preferably, the angle between the second optical surface and the bottommost surface of the integrated lens is 135°±15°, taking the bottommost surface of the integrated lens as a reference plane, and the angle between the third optical surface and the bottommost surface of the integrated lens is 150°±15°, taking the bottommost surface of the integrated lens as a reference plane.

The integrated lens may be suitable for coupling and/or connecting optical signals from an optical fiber to an optical receiver, or for coupling and/or connecting optical signals from an optical transmitter to an optical fiber. Furthermore, in an optical transceiver, integrated lenses for the receiver and for the transmitter may be proximate to and/or in parallel with each other.

Furthermore, the integrated lens for an optical receiver (herein, the "receiver integrated lens") includes the first cavity, the second cavity with the first optical surface thereon, the first lens, and a fiber adapter. The first optical surface may comprise a mirror. The receiver integrated lens may further include a collimating lens at an innermost end of the fiber adapter (i.e., an end of the fiber adapter that extends farthest into the integrated lens). The fiber adapter in the receiver integrated lens connects with and/or receives an optical signal transmission fiber.

Furthermore, an optical receiver or transceiver further comprises a photodiode (PD, such as an avalanche photodiode [APD]) positioned under the first lens. The PD is electrically connected with a transimpedance amplifier (TIA), generally by traces on a PCB on which the PD and TIA are mounted (e.g., in the first cavity).

The receiver integrated lens receives an optical signal from an optical signal transmission fiber through the lens at the innermost end of the fiber adapter, which focuses the optical signal onto the first optical surface (e.g., mirror). The optical signal is incident upon the optical surface (e.g., for total reflection of the signal), then the optical signal is reflected to the first lens (e.g., on or into the first cavity), which focuses the optical signal onto the receiver PD. The signal incident upon the receiver PD converts the optical signal into an electrical signal, which is received by the TIA. The TIA amplifies the electrical signal and provides the amplified signal to a downstream device connected to the TIA.

Furthermore, the integrated lens for an optical transmitter (the "transmitter integrated lens") includes the first cavity, the second cavity with the first and second optical surfaces thereon, the first lens, the third optical surface (on the subcavity in the first cavity), and the fiber adapter. As for the receiver integrated lens, the first optical surface may comprise a mirror, the transmitter integrated lens may further include a collimating lens at an innermost end of the fiber adapter (i.e., an end of the fiber adapter that extends farthest into the integrated lens), and the fiber adapter connects with and/or receives an optical signal transmission fiber.

Similar to the receiver integrated lens, the transmitter integrated lens is adhered to a PCB (e.g., in an optical module), over an optical signal transmitter in the first cavity. The optical signal from the optical signal transmitter is perpendicularly incident upon and focused or aligned by the first lens. The optical signal is incident upon the first and second optical surfaces on the second cavity. The optical signal reflected by the first optical surface is focused by the second lens onto an end of the optical signal transmission fiber connected to the fiber adapter, and provided to one or more devices in an optical network. The optical signal reflected by the second optical surface is incident upon the third optical surface, where the optical signal is reflected to an optical signal detector (such as a monitoring photodiode) under the third optical surface (i.e., in the first cavity). The optical signal reflected by the third optical surface is generally perpendicularly incident upon the optical signal detector. The optical signal detector under the transmitter integrated lens may be a PD or APD.

The present invention also relates to an optical transceiver including the integrated lens. The integrated lens enables optical signal transmission and reception in optical modules. Thus, in some embodiments, the optical transceiver comprises a transmitter integrated lens in proximity to and/or in parallel with a receiver integrated lens, an optical transmitter (e.g., a laser diode) below the transmitter integrated lens, configured to transmit optical signals, and an optical receiver (e.g., a photodiode) below the receiver integrated lens, configured to receive optical signals.

Furthermore, the optical transceiver may transmit and/or receive optical signals having different wavelengths (e.g., multimode optical communication). The integrated lens of the present invention may be used in single-mode or multi-mode transmission and/or reception. The multi-surface structure of the present integrated lens enables broad wavelength coverage for coupling optical signals (e.g., between the optical fiber and the transmitter or receiver) and high reflection efficiency, and has a bright future in multimode communication.

The present invention further relates to optical devices, optical modules and optical communication devices including the present integrated lens. Furthermore, the present invention further provides methods of transmitting and/or receiving optical signals using the integrated lens.

Relative to the prior art, the present integrated lens integrated with multiple optical surfaces, and including a first cavity, a second cavity, and a fiber adapter, has advantageous effects. The first cavity is at or in a lowermost surface or bottom of the integrated lens, and the second cavity is at or in an uppermost surface or top of the integrated lens. The fiber adapter is on or in the front end or face of the integrated lens, and a center axis of the fiber adapter is parallel to the lowermost surface of the integrated lens. A first lens extends into the first cavity, and may be at a location corresponding to an optical transmitter on a substrate (e.g., a PCB) on which the integrated lens is mounted or adhered. First and second planar optical surfaces (e.g., mirrors) are on bottom surfaces of the second cavity in the transmitter integrated lens. The first and second planar optical surfaces may intersect each other at an angle of 160-175°. The first optical surface may intersect the second optical surface at a line that is parallel with a planar cross-section of the integrated lens that is orthogonal to the center axis of the fiber adapter. The receiver integrated lens includes the first planar optical surface on a bottom surface of the second cavity. The innermost end of the fiber adapter includes a second lens, which may be convex. The integrated lens is applicable to optical modules and can be positioned on a PCB over an optical transmitter or optical receiver. The integrated lens can be produced by injection molding using a single mold, which enables a simple, low cost production process and high production efficiency.

A method of transmitting an optical signal using the present integrated lens having multiple optical surfaces includes aligning or focusing the optical signal from an optical transmitter (which may be on a PCB) with the first lens onto the first optical surface, reflecting the optical signal from the first optical surface to the second lens on a face of the fiber adapter, and focusing the reflected optical signal onto a fiber in the fiber adapter. The method of transmitting the optical signal may further comprise reflecting a part of the focused optical signal from the second optical surface to the third optical surface, then further reflecting the reflected optical signal to a monitoring detector. Most of the focused optical signal is reflected by the second optical surface.

A method of receiving an optical signal using the present integrated lens having multiple optical surfaces includes aligning or focusing the optical signal from a fiber in the fiber adapter with the second lens onto the first optical surface, reflecting the optical signal from the first optical surface to the first lens, and focusing the reflected optical signal onto an optical receiver (which may be on the PCB) with the first lens.

The present device and methods enable not only the connection between optical fibers and optical transmitters and/or receivers, but also optical coupling of the optical signal from an optical transmitter to a fiber and from a fiber to an optical receiver. In addition, the transmitter integrated lens may reflect a small part of the optical signal from the transmitter to a monitoring photodiode for optical signal detection and/or power measurement. The present device and optical signal receiving method may achieve synchronous optical signal detection in an optical transmitter or receiver. The integrated lens includes multiple integrated lenses and optical surfaces instead of separate or discrete passive optical components, optimizes the light path and device structure, greatly reduces production cost, has a simple and/or unitary structure and high optical coupling efficiency, may have a small size and light weight, and is applicable to various optical signal coupling connections.

BRIEF DESCRIPTION OF THE DRAWINGS

FIG. 7 is a cross-section showing a further alternative transmitter integrated lens in accordance with one or more embodiments of the present invention.

FIG. 8 is a diagram showing the light path(s) and/or an operation of the further alternative transmitter integrated lens in accordance with one or more embodiments of the present invention.

DETAILED DESCRIPTION

Figure 1:
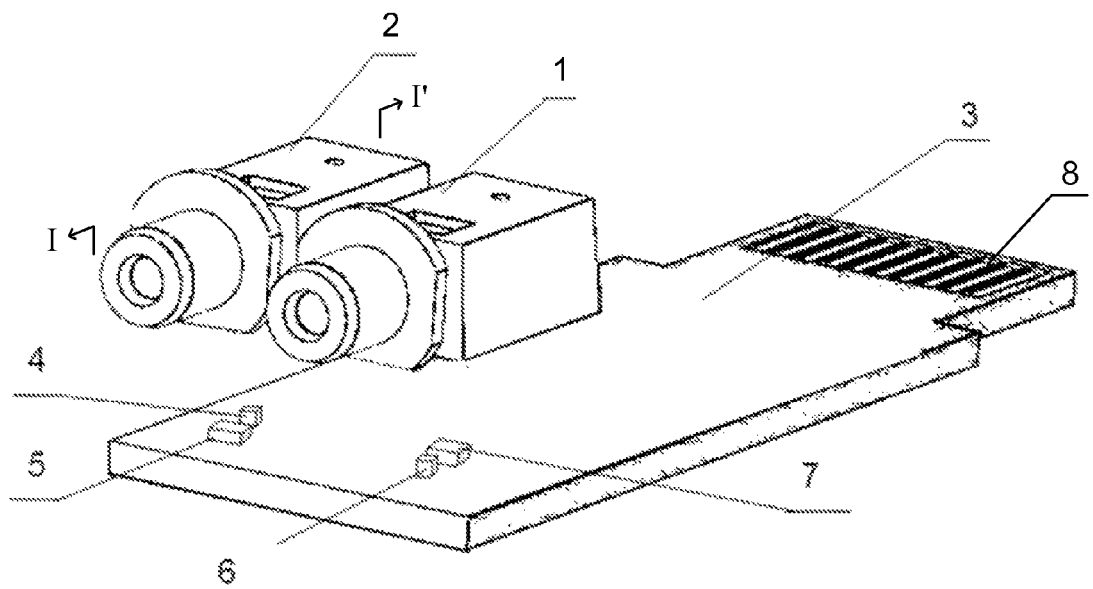
FIG. 1 is a diagram showing an exemplary installation and structure of integrated lenses suitable for an optical or optoelectronic transceiver in accordance with one or more embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic, functions, and other symbolic representations of operations on signals, code, data bits, or data streams within a computer, transceiver, processor, controller and/or memory. These descriptions and representations are generally used by those skilled in the data processing arts to effectively convey the substance of their work to others skilled in the art. A process, procedure, logic operation, function, process, etc., is herein, and is generally, considered to be a step or a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and/or otherwise manipulated in a computer, data processing system, optical component, or circuit. It has proven convenient at times, principally for reasons of common usage, to refer to these signals as bits, streams, values, elements, symbols, characters, terms, numbers, information or the like. It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring a signal or optical signal, respectively, from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

Exemplary Receiver and Transmitter Integrated Lenses

The present invention concerns housings for a receiver integrated lens (e.g., a receiver optical coupling and/or connecting device) and a transmitter integrated lens (e.g., a transmitter optical coupling and/or connecting device). As shown in FIG. 1, the receiver integrated lens 1 and the transmitter integrated lens 2 are arranged in parallel in corresponding or adjacent positions on a PCB 3. A monitoring photodiode 5 and a luminescent device (e.g., a transmitter such as a laser diode) 4 are positioned under the transmitter integrated lens 2. Also, a photodiode (PD, such as an avalanche photodiode [APD]) 6 is under the receiver integrated lens 1, and electrically connected to a transimpedance amplifier (TIA) 7.

Figure 2:
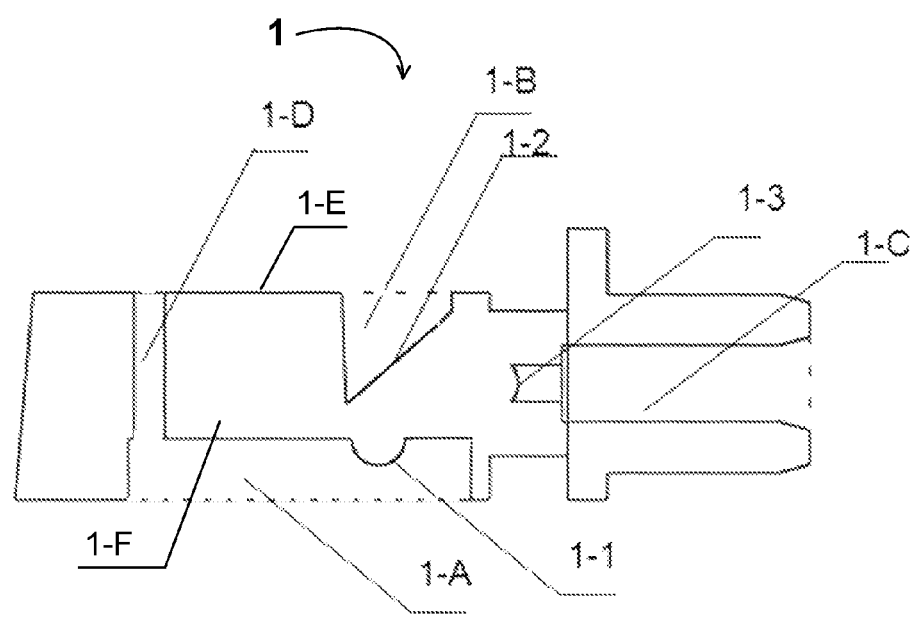
FIG. 2 is a cross-section of an exemplary receiver integrated lens in accordance with one or more embodiments in the present invention.

As shown in FIG. 2, the receiver integrated lens 1 includes a first cavity 1-A with a first lens 1-1, a second cavity 1-B, and a fiber adapter 1-C. An inner or innermost surface (e.g., the bottom) of the second cavity 1-B has a mirror surface 1-2. The receiver integrated lens 1 further includes a convex light collimating lens 1-3 at an innermost end of the fiber adapter 1-C (e.g., that extends from the body of the integrated lens into the fiber adapter).

The fiber adapter 1-C receives and is connected with an optical signal transmission fiber. The optical signal from the optical signal transmission fiber is provided to the lens 1-3 to focus the optical signal onto the mirror surface 1-2 of the second cavity 1-B, then the optical signal is reflected (e.g., completely or substantially completely) to the first lens 1-1 in the first cavity 1-A. Although a reflective material can be deposited or otherwise formed on the optical surfaces (e.g., on the bottom of the second cavity 1-B) of the integrated lenses, it is generally not necessary to do so, as the integrated lens-air interface also functions as a reflective surface. The first lens 1-1 then focuses the reflected optical signal onto the PD 6, which converts the optical signal into an electrical signal and sends it to the TIA 7 for amplification and further downstream processing.

Figure 3:
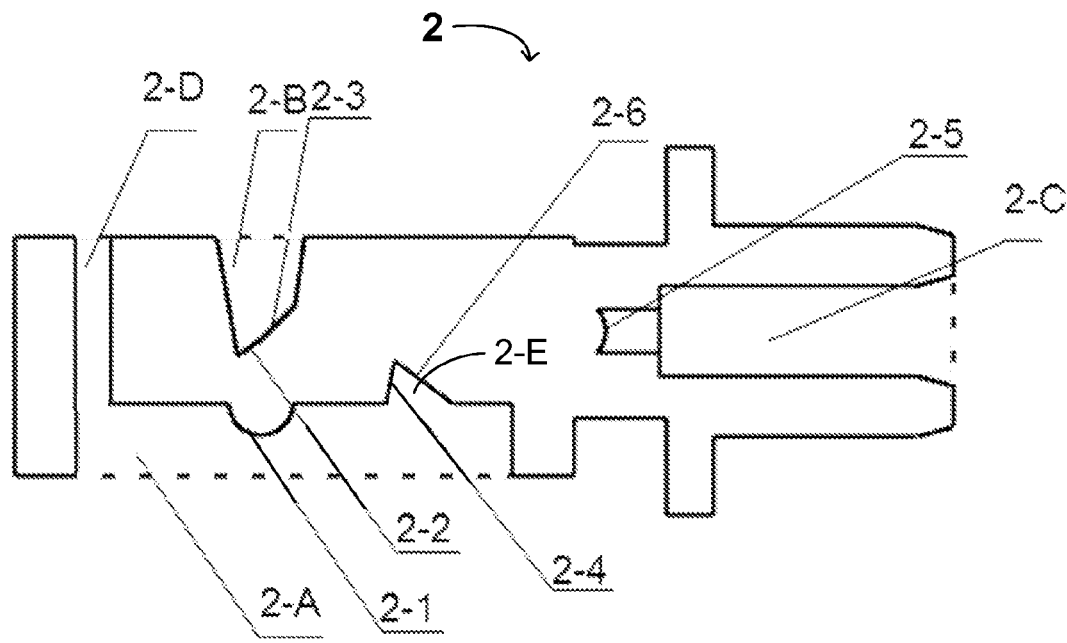
FIG. 3 is a cross-section of an exemplary transmitter integrated lens in accordance with one or more embodiments of the present invention.

As shown in FIG. 3, the transmitter integrated lens 2 is an integrated lens integrated with multiple optical surfaces and that includes a first cavity 2-A, a second cavity 2-B, and a fiber adapter 2-C. The first cavity 2-A is at the bottom or lowermost surface of the integrated lens 2, and the second cavity 2-B is at the top or uppermost surface of the integrated lens 2. Thus, the integrated lens 2 has a bottom or lowermost surface around the first cavity 2-A. The fiber adapter 2-C is on the front end or face of the integrated lens 2, and the center axis of the fiber adapter 2-C is parallel to the lowermost surface of the integrated lens 2.

A first lens 2-1 extends into the first cavity 2-A, and the first lens 2-1 may be a convex lens, in a position above an optical transmitter on a substrate (e.g., a PCB; not shown in FIG. 3). First and second inner surfaces (e.g., on the bottom) of the second cavity 2-B in the transmitter integrated lens 2 contain first and second planar optical surfaces 2-3 and 2-2 that may intersect each other at an angle of 160-175°. The first and second planar optical surfaces 2-3 and 2-2 (and, generally, all planar optical surfaces described herein) may be or comprise a mirror or other reflective surface. The transmitter integrated lens 2 has a second lens 2-5 (which may be a convex lens) at an innermost end of the fiber adapter 2-C.

Preferably, the angle between the first optical surface 2-3 and the bottommost surface of the integrated lens 2 is 135°±15°, taking the bottommost surface of the integrated lens as a reference plane. Conversely, the angle between the first optical surface 2-3 and the bottommost surface of the integrated lens 2 is 45°±15°, taking the bottommost surface of the integrated lens as a reference plane. In some implementations, the angle between the first optical surface 2-3 and the bottommost surface of the integrated lens 2 is an ideal 45° or 135°.

Preferably, the angle between the second optical surface 2-2 and the bottommost surface of the integrated lens 2 is 150°±15°, taking the bottommost surface of the integrated lens as a reference plane. Conversely, the angle between the second optical surface 2-2 and the bottommost surface of the integrated lens 2 is 30°±15°, taking the bottommost surface of the integrated lens as a reference plane. In implementations as shown in FIG. 3, the angle between the second optical surface 2-2 and the bottommost surface of the integrated lens 2 is 35° or 145°, and the angle between the first and second optical surfaces 2-3 and 2-2 is 170°.

The integrated lens 2 integrated with multiple optical surfaces is positioned above an optical signal transmitter (e.g., laser diode 4, FIG. 1) on a PCB (e.g., optical module PCB 3, FIG. 1). The optical signal from the optical signal transmitter 4 is perpendicularly incident upon and focused and/or aligned by the first lens 2-1 (FIG. 3), and then reflected by the first and second optical surfaces 2-3 and 2-2. The first optical surface 2-2 reflects the optical signal to the second lens 2-5 along a path parallel or substantially parallel with the bottom of the integrated lens 2, or the center axis of the fiber adapter 2-C. The reflected optical signal is focused by the second lens 2-5 towards an optical signal transmission fiber inserted into and/or connected with a fiber adapter, where it is transmitted to one or more other devices (e.g., in an optical network). The second optical surface 2-2 reflects part of the optical signal (e.g., 5-10% of the optical signal towards the third optical surface 2-4 (see the discussion of FIG. 4 below).

The integrated lenses 1 and 2 may comprise or be made from a highly transparent, high modulus of elasticity material, such as glass, PEI, PET, PS or PMMA. For example, the transmitter and receiver integrated lenses may both be made from PEI. In some examples, the transmitter and receiver integrated lenses are separate devices. In other examples, the transmitter and receiver integrated lenses can be a single unit, and can be formed in a single injection molding process.

The integrated lens (i.e., 1 or 2) includes a vent hole (1-D in FIGS. 2 and 2-D in FIG. 3). The vent hole 1-D or 2-D is generally in the portion of the integrated lens 1 or 2 distal from the fiber adapter 1-C or 2-C, and communicates with the first cavity 1-A or 2-A, thereby permitting air flow in and out of the first cavity, and enabling a route for heat to transfer out of the first cavity 1-A or 2-A during operation. The vent holes 1-D and 2-D also facilitate attachment of the bottommost surface of the integrated lenses 1 and 2 to a substrate such as the PCB 3 in FIG. 1 with an adhesive such as optical cement by preventing air from becoming trapped in the first cavity 1-A or 2-A, and allowing any solvent or other gas fumes or by-products from the adhesive to escape.

Furthermore, in the transmitter integrated lens 2, the first cavity on the light emission integrated lens 1 further contains a third optical surface 2-4, which is an inclined surface on a subcavity 2-E extending from the first cavity 2-A into the transmitter integrated lens 2. The subcavity 2-E is generally between the fiber adapter 2-C and the first lens 2-1, the first optical surface 2-3, and/or the second optical surface 2-2.

Furthermore, an optical signal detector (e.g., an optical monitoring detector such as a photodiode 5, FIG. 1) is positioned under the third optical surface 2-4 (FIG. 3). The optical signal from an optical transmitter (e.g., laser diode 4, FIG. 1) is perpendicularly incident upon and focused and/or aligned by the first lens 2-1 (FIG. 3) onto the first and second optical surfaces 2-3 and 2-2. Part of the optical signal is reflected by the second optical surface 2-2 towards the third optical surface 2-4, which refracts the reflected part of the optical signal onto the optical signal detector 5 (FIG. 1).

A First Exemplary Transmitter Integrated Lens

As shown in FIG. 3, an integrated lens 2 integrated with multiple optical surfaces comprises a first cavity 2-A, a second cavity 2-B, and a fiber adapter 2-C. The first cavity 2-A is at the bottom of the integrated lens 2. The second cavity 2-B is at the top of the integrated lens. The fiber adapter 2-C is at the front end or face of the integrated lens 2. The center axis of the fiber adapter 2-C is parallel to the lowermost surface of the integrated lens 2. The first cavity 2-A has a first convex lens 2-1 that extends into the first cavity 2-A, above an optical transmitter (e.g., laser diode 5 in FIG. 1). The second cavity 2-B forms first and second planar optical surfaces 2-3 and 2-2 that intersect each other at an angle of 160-175°. The integrated lens 2 includes a second convex lens 2-5 at an innermost end of the fiber adapter 2-C.

Furthermore, as shown in FIG. 3, the transmitter integrated lens 2 further contains a third, inclined optical surface 2-4 on a subcavity 2-E of the first cavity 2-A, close to the fiber adapter 2-C. The third optical surface 2-4 is inclined relative to the bottom of the integrated lens 2. Referring to FIG. 3, a fourth optical surface 2-6 also intersects with the top of the third optical surface, but the fourth optical surface 2-6 merely defines a second sloped surface of the subcavity 2-E when the fourth optical surface 2-4 is in or on the integrated lens 2.

Furthermore, as shown in FIG. 3, taking the bottommost surface of the integrated lens 2 as a reference plane, the angle between the third optical surface 2-4 and the bottommost surface of the integrated lens 2 facing the fiber adapter 2-C is an acute angle (i.e., less than 90°). This enables the injection mold for the integrated lens 2 to be produced more easily, with low production costs, a simple structure, and relatively high yields. For example, the angle between the third optical surface 2-4 and the bottommost surface of the integrated lens 2 that faces the fiber adapter 2-C is from 65° to 85° (e.g., 79°±5°).

Figure 4:
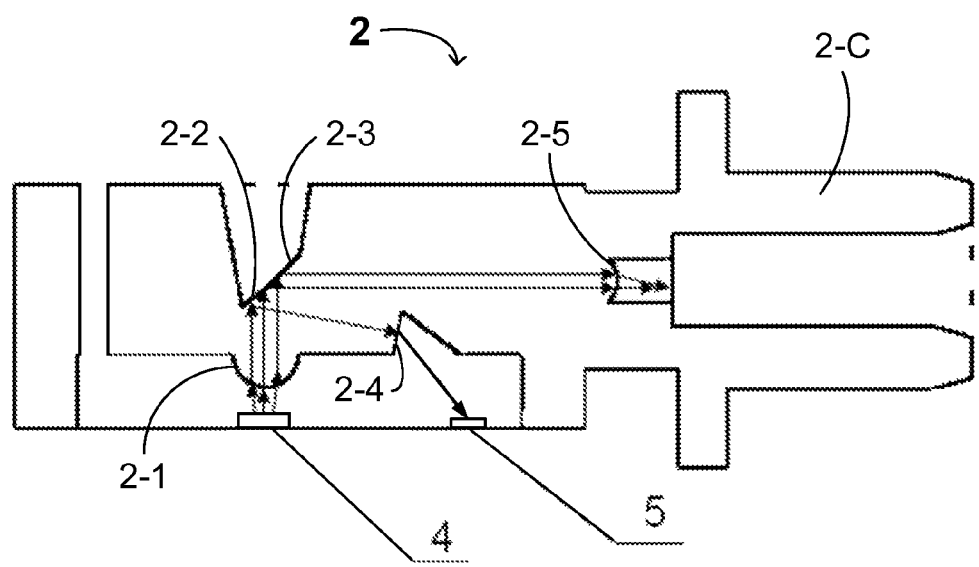
FIG. 4 is a diagram showing light path(s) and/or an operation of an exemplary receiver integrated lens in accordance with one or more embodiments of the present invention.

In this embodiment, FIG. 4 shows transmission paths of transmitted optical signals using straight arrows. The integrated lens 2 is positioned over an optical signal transmitter 4 on an optical module PCB (not shown). The optical signal from the optical signal transmitter 4 is incident upon and aligned by the first lens 2-1, and then reflected by the first and second optical surfaces 2-3 and 2-2. After being reflected by the first optical surface 2-3, the optical signal is focused by the second lens 2-5, then is incident upon an optical signal transmission fiber (not shown) connected to the fiber adapter 2-C. In addition, the part of the optical signal from the optical signal transmitter 4 reflected by the second optical surface 2-2 to the third optical surface 2-4 is refracted by the third optical surface 2-4 to a monitoring photodiode 5.

A Second Exemplary Transmitter Integrated Lens

Figure 5:
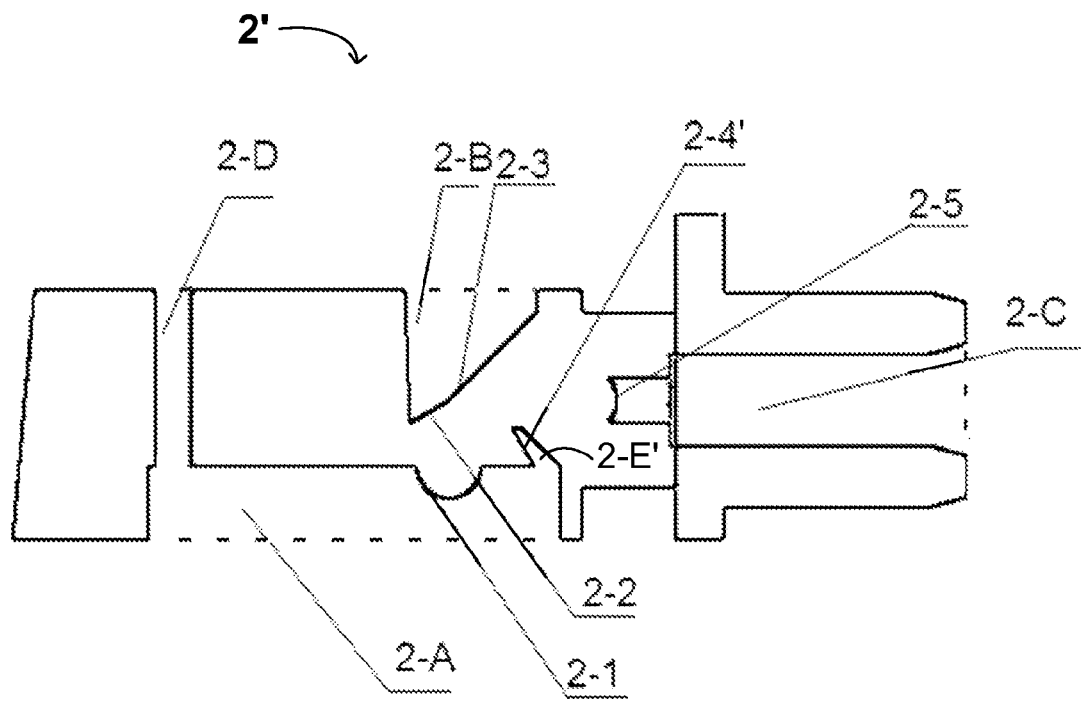
FIG. 5 is a cross-section showing an exemplary transmitter integrated lens in accordance with one or more embodiments of the present invention.
Figure 6:
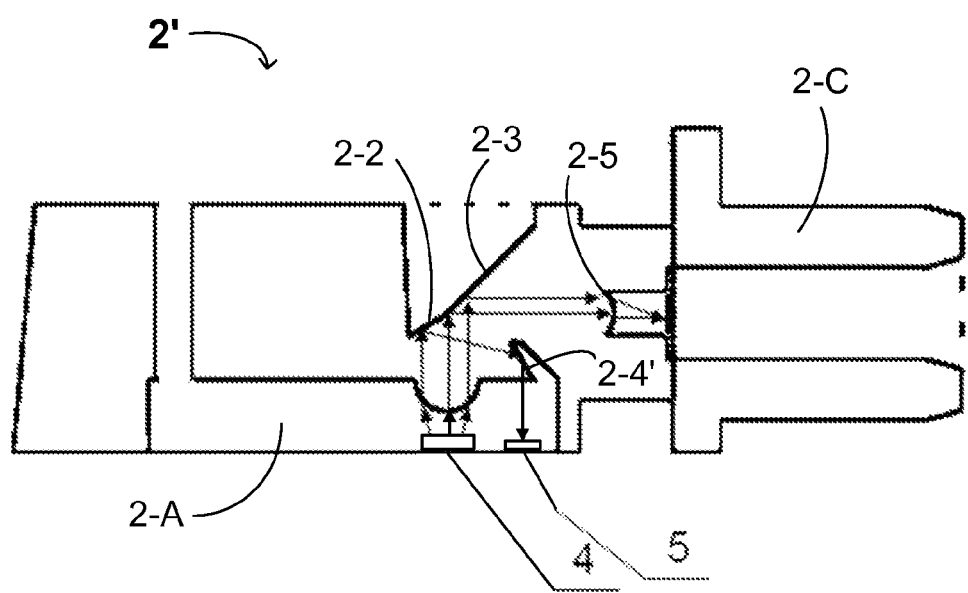
FIG. 6 is a diagram showing light path(s) and/or an operation of an alternative transmitter integrated lens in accordance with one or more embodiments of the present invention.

As shown in FIG. 5, a transmitter integrated lens 2' having multiple integrated optical surfaces comprises a first cavity 2-A, a second cavity 2-B, and a fiber adapter 2-C, similar to or the same as the transmitter integrated lens 2 of FIG. 3. The transmitter integrated lens 2' of FIG. 5 has a convex first lens 2-1 extending into the first cavity 2-A, above an optical transmitter (e.g., laser diode 4; FIG. 6). The second cavity 2-B contains first and second planar optical surfaces 2-3 and 2-2 that intersect with each other at an angle of 160°-175°. Like transmitter integrated lens 2', the transmitter integrated lens 2' includes a convex second lens 2-5 at an innermost end of the fiber adapter 2-C.

However, as shown in FIG. 5, the transmitter integrated lens 1 has a subcavity 2-E' in the first cavity 2-A defining a fourth optical surface 2-4' that is between the fiber adapter 2-C and at least one of the first lens and the second planar optical surface 2-2. Taking the bottommost surface of the integrated lens 2' as a reference plane, the angle between the fourth optical surface 2-4' and the bottommost surface of the integrated lens 2' facing the fiber adapter 2-C is an obtuse angle (i.e., greater than 90°). In one example, the angle between the fourth optical surface 2-4' and the bottommost surface of the integrated lens 2' is from 91° to 116° (e.g., 101°±10°, taking the bottommost surface of the integrated lens 2' as a reference plane. In this case, when the optical signal reflected by the second optical surface 2-3 is incident upon the fourth optical surface 2-4', its incident angles are greater than the critical angle of the reflection. That is, the second and fourth optical surfaces 2-3 and 2-4' can reflect the optical signal to the optical monitoring detector with minimal losses. The optical monitoring detector (e.g., a photodiode 5; see FIG. 6) is under the fourth optical surface 2-4'. Therefore, this structure is relatively simple, and provides high reflection efficiency.

FIG. 6 shows the transmission paths of the transmitted optical signals in this embodiment. The integrated lens is positioned over the optical signal transmitter 4 on a substrate such as an optical module PCB (not shown). The optical signal from the optical signal transmitter 4 is incident upon and aligned or focused by the first lens 2-1 onto the first and second optical surfaces 2-3 and 2-2. The first optical surface 2-3 reflects the optical signal to the second lens 2-5, which focuses the optical signal upon an optical signal transmission fiber (or an end or predetermined internal position thereof) connected to the fiber adapter 2-C.

In addition, part of the optical signal from the optical signal transmitter 4 is reflected by the second optical surface 2-2 to the fourth optical surface 2-4', which reflects it to an optical signal detector (such as a photodiode) 5. As the angle between the second and fourth optical surfaces 2-2 and 2-4' is great, the incident angle of the light from the second optical surface 2-2 upon the fourth optical surface 2-4' is always much greater than the reflection angle. As a result, the optical signal can be reflected by the fourth optical surface 2-4' to the optical signal detector 5 with minimal losses.

A Third Exemplary Transmitter Integrated Lens

FIG. 7 shows a transmitter integrated lens 2" with multiple integrated optical surfaces, comprising a first cavity 2-A, a second cavity 2-B, and a fiber adapter 2-C. The transmitter integrated lens 2" is substantially the same as the transmitter integrated lens 2' of FIG. 5, except that it further includes a convex third lens 2-7. The third lens 2-7 extends into the first cavity 2-A and is located above the monitoring detector 5 (see FIG. 6), proximate to the bottom of the fourth optical surface 2-4'. The transmitter integrated lens 2" works in substantially the same way as the transmitter integrated lens 2' of FIG. 5, except that the optical signal reflected by the fourth optical surface 2-4' is focused by the third lens 2-7 onto the monitoring detector 5 below the fourth optical surface 2-4'. The optical signal reflected by the fourth optical surface 2-4' and focused by the third lens 2-7 can be more effectively transmitted to the optical detector 5, thereby increasing the detection efficiency.

FIG. 8 shows transmission paths of the transmitted optical signals in this embodiment. The integrated lens 2" is over the optical signal transmitter 4 on a substrate (e.g., an optical module PCB; not shown). The optical signal from the optical signal transmitter 4 is aligned and/or focused by the first lens 2-1 and reflected by the first and second optical surfaces 2-3 and 2-2 in the same way as integrated lenses 2 and 2' in FIGS. 4 and 6. The optical signal is reflected by the first optical surface 2-3 to the second lens 2-5, which focuses the reflected optical signal onto the optical signal transmission fiber in the fiber adapter 2-C in the same way as integrated lenses 2 and 2' in FIGS. 4 and 6.

Figure 9:
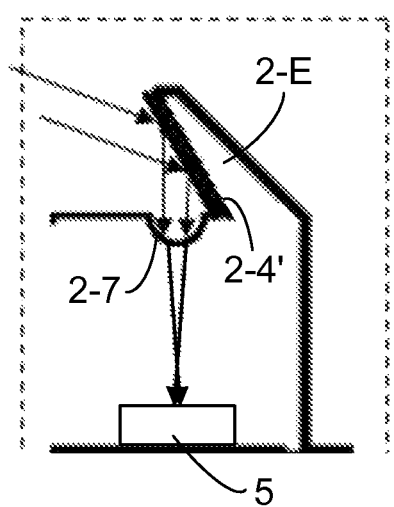
FIG. 9 is an enlarged view of a portion of the further alternative transmitter integrated lens of FIG. 8.

In addition, part of the optical signal incident upon the second optical surface 2-2 reflected to the fourth optical surface 2-4' in the same way as the integrated lens 2' in FIG. 6, and the fourth optical surface 2-4' further reflects the part of the optical signal to the third lens 2-7, which focuses the doubly-reflected part of the optical signal onto the optical signal detector 5. FIG. 9 is an enlargement of the part of the integrated lens 2" surrounded by the dashed line in FIG. 8. The third lens 2-7 under the fourth optical surface 2-4' can collect the light reflected by the fourth optical surface 2-4' and focus it onto the optical detector (e.g., monitoring photodiode 5).

A Fourth Exemplary Transmitter Integrated Lens

Figure 10A:
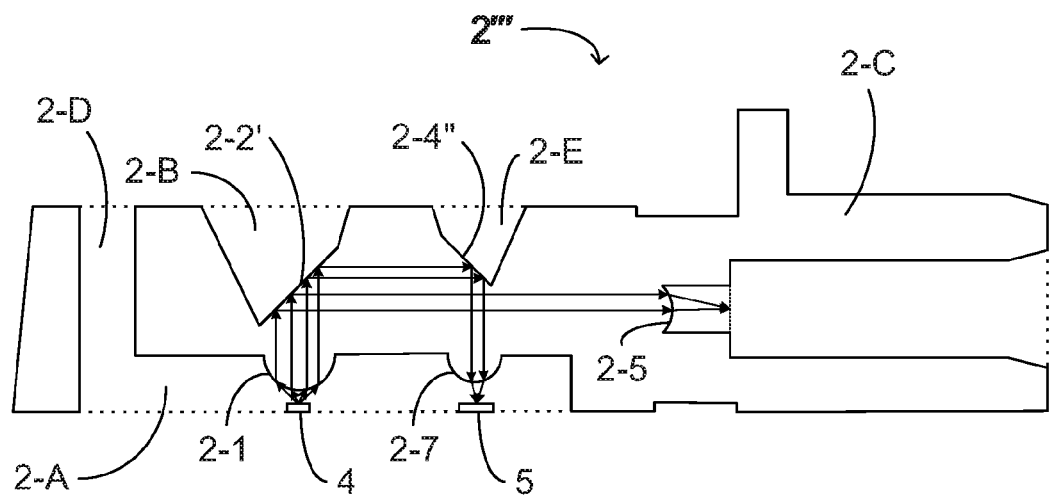
FIG. 10A is a cross-section showing a still further alternative transmitter integrated lens in accordance with one or more embodiments of the present invention.

FIG. 10A is a cross-section of a transmitter integrated lens 2''' with multiple integrated optical surfaces in accordance with one or more embodiments of the present invention. The transmitter integrated lens 2''' comprises a first cavity 2-A having an opening 2-D through the integrated lens, a second cavity 2-B, a fiber adapter 2-C, and a third cavity 2-E. The first cavity 2-A houses an optical signal transmitter (e.g., laser) 4 and a monitoring detector (e.g., photodiode) 5. The first and third lenses 2-1 and 2-7 extend into the first cavity 2-A, and are respectively located above the laser 4 and the monitoring detector 5.

FIG. 10A shows transmission paths of the transmitted optical signals. The integrated lens 2''' is over the optical signal transmitter 4 on a substrate (e.g., an optical module PCB; not shown). The optical signal from the optical signal transmitter 4 is aligned and/or focused by the first lens 2-1 and reflected by a single optical surface 2-2' towards both a reflective optical surface 2-4" and the second lens 2-5, which focuses the reflected optical signal onto the optical signal transmission fiber in the fiber adapter 2-C in the same way as integrated lenses 2, 2' and 2" in FIGS. 4, 6 and 8. Most of the reflected optical signal passes through the second lens 2-5. Part of the reflected optical signal is further reflected by the reflective optical surface 2-4" to the third lens 2-7. The third lens 2-7 focuses light reflected by the optical surface 2-4" onto the other monitoring detector 5.

Figure 10B:
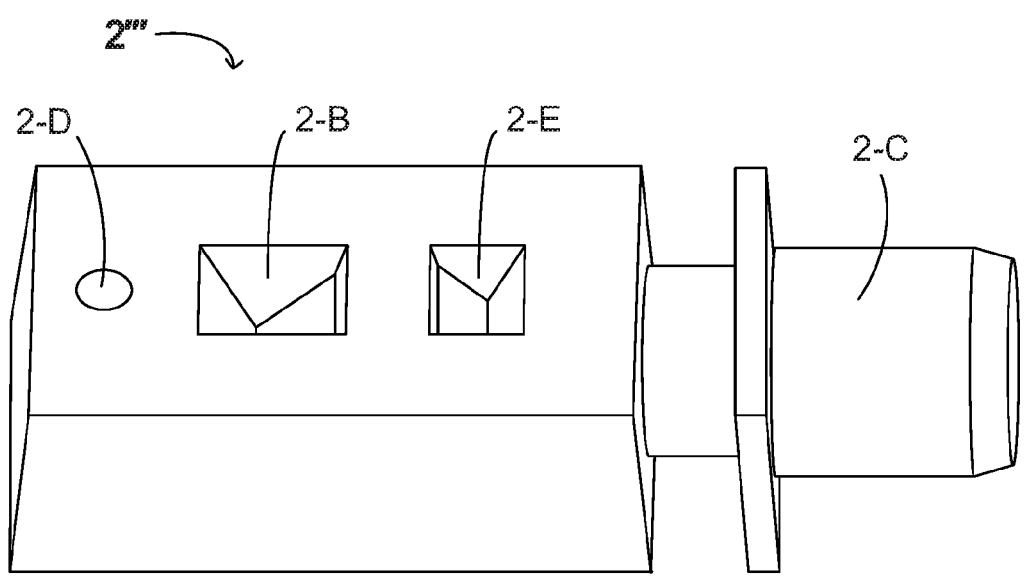
FIG. 10B is an exterior view of the transmitter integrated lens of FIG. 10A.

FIG. 10B is an exterior view of the transmitter integrated lens 2''' of FIG. 10A. The depth of the second cavity 2-B is greater than that of the third cavity 2-E to enable most of the optical signal reflected by the optical surface 2-2' to travel along the optical path to the second lens 2-5. However, the depth of the third cavity 2-E must be sufficient to reflect part of the reflected optical signal to the third lens 2-7. In general, the amount of the reflected optical signal reflected by the optical surface 2-4" to the third lens 2-7 is in the range of 1-10% (e.g., 3-5%).

The optical surface 2-2' and the reflective optical surface 2-4" are each at an angle of 45° with respect to the lowermost surface of the transmitter integrated lens 2'''. However, the optical surface 2-2' and the reflective optical surface 2-4" may be at other angles (e.g., 30°-60°) with respect to the uppermost or lowermost surface of the transmitter integrated lens 2'''. In one embodiment, the optical surface 2-2' and the reflective optical surface 2-4" are at an angle of 90° with respect to each other.

The arrangement of cavities and reflective surfaces in the transmitter integrated lens 2''' generally has greater tolerance for misalignment of the optical signal transmitter 4, the monitoring detector 5, and/or the optical fiber (not shown) in the fiber adapter 2-C. In other words, the placement and/or position of the optical signal transmitter 4, the monitoring detector 5, and/or the optical fiber can vary more in designs employing the transmitter integrated lens 2''' than other transmitter integrated lenses (e.g., integrated lenses 2, 2' and 2").

An Exemplary Transceiver

The present invention further relates to optical devices, optical modules and optical communication devices including the present integrated lens (e.g., optical coupling and/or connecting devices). For example, the optical device, optical module and optical communication device may be an optical transceiver, which may comprise a receiver integrated lens (e.g., the exemplary integrated lens 1 in FIG. 2), a photodiode or other optical signal detector in the first cavity thereof, a transmitter integrated lens (e.g., the exemplary integrated lens 2, 2' or 2" in FIG. 3, 5 or 7), and a laser diode or other optical signal transmitter in the first cavity thereof. The photodiode in the first cavity of the receiver integrated lens (e.g., a receiver photodiode) is positioned to receive an incoming optical signal from the first lens of the receiver integrated lens. The laser diode in the first cavity of the transmitter integrated lens is positioned to emit an outgoing optical signal to the first lens of the transmitter integrated lens.

As is described herein, the receiver integrated lens may comprise a first cavity on a first side of the integrated lens, a first lens extending into or away from the first cavity, a second cavity on an opposite side of the integrated lens, a first optical surface on an inner surface of the second cavity, a fiber adapter configured to receive an optical fiber (e.g., the receiver optical fiber), and a second lens at an innermost end of the fiber adapter. Each of the first and second lenses, the first optical surface, and the fiber adapter are integrated into the receiver integrated lens. As is described herein, the transmitter integrated lens may comprise another first cavity on a first side of the transmitter integrated lens, another first lens extending into the other first cavity, another second cavity on a side of the transmitter integrated lens opposite from the first cavity, another first optical surface on a first inner surface of the other second cavity, another fiber adapter configured to receive another optical fiber (e.g., a transmitter optical fiber), another second lens at an innermost end of the other fiber adapter, a second optical surface on a second inner surface of the other second cavity, and a subcavity (as described herein) extending from the first cavity, having a third optical surface thereon. The second optical surface is adjacent to the other first optical surface. The third optical surface is between the other fiber adapter and at least one of the second optical surface and the other first lens. Each of the other first and second lenses, the other first optical surface, the second optical surface, the other fiber adapter, and the third optical surface are integrated into the transmitter integrated lens.

In various embodiments of the optical transceiver, the receiver integrated lens and the transmitter integrated lens are proximate to and in parallel with each other (for example, as shown in FIG. 1). In further embodiments, the optical transceiver further includes an optical signal detector (e.g., a monitoring photodiode) in the first cavity of the transmitter integrated lens and/or a transimpedance amplifier (TIA) in the first cavity of the receiver integrated lens, as described herein (e.g., as shown in FIG. 1). The monitoring photodiode is configured to receive a part of the outgoing optical signal reflected from the third optical surface, as described herein. The TIA is electrically connected to the receiver photodiode. Each of the monitoring photodiode and the receiver photodiode may be an avalanche photodiode.

Exemplary Methods of Transmitting and Receiving an Optical Signal

Furthermore, the present invention further provides methods of transmitting and receiving optical signals using the integrated lens. For example, a method of receiving an optical signal may comprise providing an optical signal from an optical fiber to a receiving lens integrated into the integrated lens (e.g., the second lens as described herein), focusing the optical signal with the receiving lens onto a receiving optical surface (e.g., the first optical surface as described herein), reflecting the optical signal optical detector in the lower cavity to a focusing lens, and focusing the reflected optical signal using the focusing lens onto an optical detector. The integrated lens has a fiber adapter configured to receive the optical fiber, and the receiving lens is at an innermost end of the fiber adapter. The receiving optical surface (e.g., the first optical surface or mirror, as described herein) is on an upper cavity (e.g., the second cavity, as described herein) in a first side of the integrated lens, and the focusing lens (e.g., the first lens, as described herein) is in or extends into a lower cavity (e.g., the first cavity, as described herein) on a side of the integrated lens opposite from the first side. The optical detector (e.g., a photodetector) is in the lower cavity.

A method of transmitting an optical signal may comprise emitting an optical signal from an optical transmitter in the first cavity of the integrated lens, focusing the optical signal using the first lens onto the first and second optical surfaces as described herein, reflecting the optical signal from the first optical surface to the second lens, focusing the reflected optical signal onto an optical fiber using the second lens, reflecting part of the optical signal from the second optical surface to a third optical surface, and receiving the reflected part of the optical signal at a monitoring photodetector. As is described herein, the first and second lenses, the first, second and third optical surfaces, and the fiber adapter are integrated into the integrated lens. The first lens extends into the first cavity, and the first and second optical surfaces are on inner surfaces of the second cavity. The first and second cavities are in or on opposite sides of the integrated lens. The integrated fiber adapter is configured to receive an optical fiber, and the second lens is at an innermost end of the fiber adapter. The third optical surface is on a subcavity of the first cavity, and may have any of the forms described herein. The third optical surface is between the fiber adapter and at least one of the second optical surface and the first lens. There may be a third integrated lens below the third lens and extending into the first cavity, as described herein, that focuses the reflected part of the optical signal onto the monitoring photodetector. The monitoring photodetector may be positioned on a substrate (e.g., a PCB) in the first cavity.

CONCLUSION/SUMMARY

Embodiments of the present invention advantageously provide an integrated lens with multiple integrated optical surfaces and lenses. The integrated lens includes a first cavity, a second cavity, and a fiber adapter. The first cavity is in an underside of the integrated lens; the second cavity is in an uppermost surface of the integrated lens. The fiber adapter is at a front end and/or face of the integrated lens, and the center axis of the fiber adapter is parallel to the lowermost surface of the integrated lens. A first lens of the integrated lens extends into the first cavity. The first lens may be convex, and may be located above a position or location of an optical transmitter. The bottom of the second cavity contains first and second planar optical surfaces that intersect with each other at an angle of 160°-175°, and that may form a line or ridge that is parallel with a cross-section of the integrated lens that is orthogonal to the center axis of the fiber adapter. The integrated lens includes a second lens at an innermost end of the fiber adapter. The second lens may be a convex lens. The integrated lens is applicable to optical modules and can be positioned in a location on a PCB that couples and/or connects an optical transmitter and/or optical receiver to a corresponding fiber (and vice-versa). The integrated lens can be manufactured by injection molding in a single mold, which offers a simple, low cost production process and high production efficiency.

A receiver integrated lens having multiple integrated optical surfaces and lenses provides, with the interaction of one or more optical surfaces and one or more lenses, aligning and/or focusing the optical signal from an optical fiber in a fiber adapter (e.g., on the front end of the integrated lens) with a lens at an innermost end of the fiber adapter onto a first optical surface, reflecting the optical signal from the first optical surface towards a lens in a cavity of the integrated lens, and focusing the reflected optical signal onto an optical detector (e.g., a photodiode) on a substrate with lens in the cavity. A transmitter integrated lens having multiple integrated optical surfaces and lenses provides, with the interaction of one or more of the optical surfaces and one or more of the lenses, aligning and/or focusing the optical signal from an optical transmitter on a substrate with a first lens onto a first optical surface, reflecting the optical signal from the first optical surface towards a second lens at an innermost end of a fiber adapter, and focusing the reflected optical signal onto a fiber in the fiber adapter (e.g., on the front end of the integrated lens). The transmitter integrated lens according to the invention can also reflect a part of the optical signal from a second optical surface adjacent to the first optical surface to a third optical surface, then the third optical surface reflects the part of the optical signal to an optical signal detector (e.g., a monitoring photodiode). Most of the optical signal from the transmitter is reflected by the first optical surface.

The process(es) enable not only the connection between optical transmitters and transmission fibers, but also the coupling of the optical signal from an optical transmitter to an optical fiber, and from an optical fiber to an optical receiver. In addition, the integrated lens further takes a part of the optical signal from the transmitter for monitoring the transmitted optical signal, thereby achieving synchronous optical signal transmission and detection. The integrated lens executes the process using multiple optical surfaces instead of discrete and/or complex optical coupling and/or connecting components, thereby optimizing the optical signal path, simplifying the device structure, and greatly reducing production costs. The integrated lens can have a simple, compact structure, a small size, light weight, and high optical coupling efficiency, and is applicable to various optical signal coupling connections.

Moreover, the transmitter integrated lens can be placed proximate to a receiver integrated lens in parallel in an optical transceiver, for transmission and reception of optical signals in a single module. This present integrated lens is applicable to optical devices, optical modules and optical communication devices.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An integrated lens having multiple integrated optical surfaces and lenses, comprising:
    a first cavity housing or providing a space for at least two optoelectronic devices on a first side of the integrated lens;
    a first lens extending into or away from the first cavity;
    a second cavity on a second side of the integrated lens opposite to the first side of the integrated lens;

a first optical surface on an inner surface of the second cavity;

a cylindrical fiber adapter extending into the integrated lens, configured to receive an optical fiber; and a second lens at an innermost end of the fiber adapter configured to focus light reflected by the first optical surface;

a third cavity on the second side of the integrated lens;

a second optical surface on an inner surface of the third cavity;

a third lens extending into or away from the first cavity, configured to focus light reflected by the second optical surface; and a vent hole through the integrated lens, from the first cavity to an exposed surface on the second side of the integrated lens, wherein each of the first, second and third lenses, the first and second optical surfaces, and the fiber adapter are integrated into the integrated lens, and the integrated lens has a bottom or lowermost surface around the first cavity that is configured to be attached, mounted or adhered to a substrate on which the at least two optoelectronic devices are attached or mounted.

2. The integrated lens of claim 1, wherein each of the first lens and the second lens are convex.

3. The integrated lens of claim 2, wherein the third lens is convex.

4. The integrated lens of claim 1, wherein the first optical surface comprises a mirror.

5. The integrated lens of claim 4, wherein the second optical surface comprises a mirror.

6. The integrated lens of claim 1, wherein each of the first and second optical surfaces are planar, and an angle between the first and second optical surfaces is 90°.

7. The integrated lens of claim 1, wherein the first lens is configured to align and/or focus an optical signal from the first cavity onto the first optical surface, the first optical surface is configured to reflect the optical signal to the second optical surface and the second lens, and the second optical surface is configured to reflect part of the optical signal to the third lens.

8. The integrated lens of claim 1, comprising a glass, a polyetherimide (PEI), a polyethersulfone (PES), polyethylene terephthalate (PET), a polystyrene (PS), or polymethyl methacrylate (PMMA).

9. An optical transceiver, comprising:
a transmitter integrated lens, comprising the integrated lens according to claim 1;
a laser diode in the first cavity, positioned to emit an outgoing optical signal to the first lens;
a receiver integrated lens, comprising:
  another first cavity on a first side of the receiver integrated lens;
  another first lens extending into the other first cavity;
  another second cavity on a second side of the receiver integrated lens opposite to the first side of the receiver integrated lens;
  another first optical surface on a first inner surface of the other second cavity;
  another vent hole through the receiver integrated lens, from the other first cavity to an exposed surface on the second side of the receiver integrated lens;
  another fiber adapter extending into the receiver integrated lens, configured to receive another optical fiber; and
  another second lens at an innermost end of the other fiber adapter;

wherein each of the other first and second lenses, the other first optical surface, and the other fiber adapter, are integrated into the receiver integrated lens; and
a photodiode in the other first cavity, positioned to receive an incoming optical signal from the other first lens.

10. The optical transceiver of claim 9, further comprising the substrate.

11. The optical transceiver of claim 10, wherein the other first cavity houses or provides a space for the photodiode, and the receiver integrated lens has a bottom or lowermost surface around the other first cavity that is on the substrate.

12. The optical transceiver of claim 9, wherein the other fiber adapter is cylindrical.

13. The optical transceiver of claim 9, wherein the second optical surface is configured to reflect part of the optical signal from the first optical surface to the second lens.

14. The optical transceiver of claim 9, wherein the receiver integrated lens and the transmitter integrated lens are proximate to and in parallel with each other.

15. The optical transceiver of claim 9, wherein the photodiode is an avalanche photodiode.

16. The optical transceiver of claim 9, further comprising a transimpedance amplifier to which the photodiode is electrically connected.

17. The optical transceiver of claim 9, further comprising an optical signal detector in the first cavity, configured to receive a part of the outgoing optical signal from the second optical surface and the third lens.

18. A method of making the integrated lens of claim 1, comprising injecting a material for the integrated lens into a mold having a shape of the integrated lens, and removing the injected material from the mold.

19. The integrated lens of claim 1, wherein the second optical surface is configured to reflect part of the optical signal from the first optical surface to the second lens.

20. A method of transmitting an optical signal, comprising:
emitting an optical signal from an optical transmitter in a first cavity of an integrated lens, wherein the first cavity houses or provides a space for the optical transmitter, and the integrated lens has a bottom or lowermost surface around the lower cavity that is attached, mounted or adhered to a substrate on which the optical transmitter is attached or mounted;
focusing the optical signal using a first lens onto a first optical surface, the first lens being integrated into the integrated lens and extending into the first cavity, and the first optical surface being on a second cavity in a side of the integrated lens opposite from that of the first cavity;
reflecting the optical signal from the first optical surface to a second lens integrated into the integrated lens, the integrated lens having an integrated cylindrical fiber adapter extending into the integrated lens and configured to receive an optical fiber, and the second lens being at an innermost end of the fiber adapter;
focusing the reflected optical signal using the second lens onto the optical fiber;
reflecting part of the optical signal from the first optical surface to a second optical surface on a third cavity in the side of the integrated lens opposite from that of the first cavity, the second optical surface being between the fiber adapter and the first optical surface;
focusing light reflected by the second optical surface using a second lens extending into or away from the first cavity;

receiving the reflected part of the optical signal at a monitoring photodetector in the first cavity; and venting heat through a vent hole through the integrated lens, from the first cavity to an exposed surface on the side of the integrated lens opposite from that of the first cavity.

\* \* \* \* \*